March 15, 1932.                R. M. LIPPARD                1,849,546
CHUCK
Filed June 18, 1930

Inventor
Robert M. Lippard
By Geo. H. Kennedy Jr.
Attorney

Patented Mar. 15, 1932

1,849,546

UNITED STATES PATENT OFFICE

ROBERT M. LIPPARD, OF DETROIT, MICHIGAN, ASSIGNOR TO THE HEALD MACHINE COMPANY, OF WORCESTER, MASSACHUSETTS, A CORPORATION OF MASSACHUSETTS

CHUCK

Application filed June 18, 1930. Serial No. 462,107.

The present invention relates to workholding chucks, particularly of the type that provides a plurality of jaws that are movable radially to engage and disengage the work.

With such a chuck, usually providing three radial jaws having work-engaging projections 120° apart, a difficulty is encountered in the retention of workpieces that present noncontinuous surfaces for engagement by said jaw projections,—for example, workpieces such as gears, sprocket wheels and the like. With an object of this character, unless the number of spaces between its surface projections or teeth is exactly divisible by three (or whatever number of equally-spaced jaws the chuck may have), the holding points will not be equidistant from the center, and the object therefore will not be properly centered in the chuck. Heretofore, to remedy this difficulty, it has been necessary to forego the employment of the usual chuck jaws, and to replace the same with special jaws adapted to give a more extended surface contact with the object, thereby to straddle one or more of its projections or teeth.

According to the present invention, this difficulty is overcome by arranging certain of the chuck jaws for limited angular adjustment, thereby to adapt them readily to the irregularities of surface of the work to be held in the chuck. Other and further objects and advantages of the invention will be apparent from the following detailed description thereof, taken in connection with the accompanying drawings, in which—

Like reference characters refer to like parts in the different figures.

Figure 1:
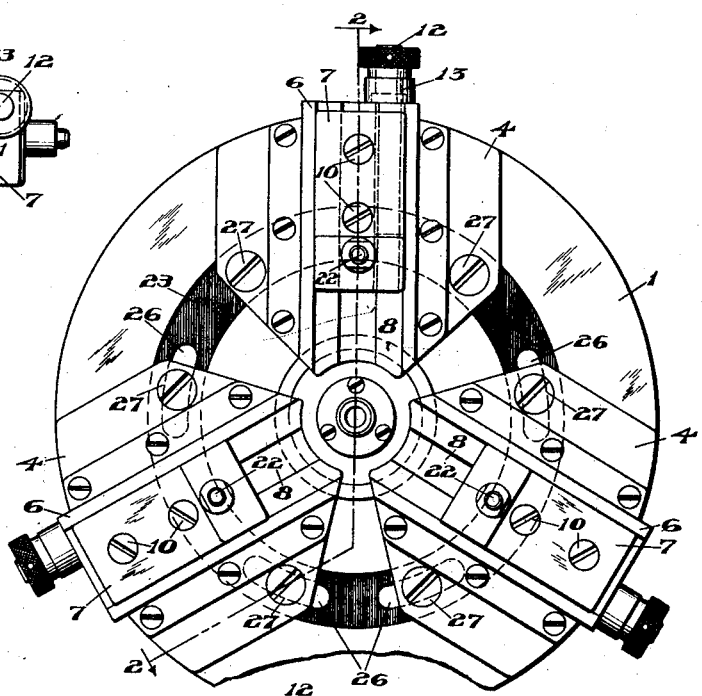
Fig. 1 is a front view of a chuck embodying my invention.
Figures 2, 4:
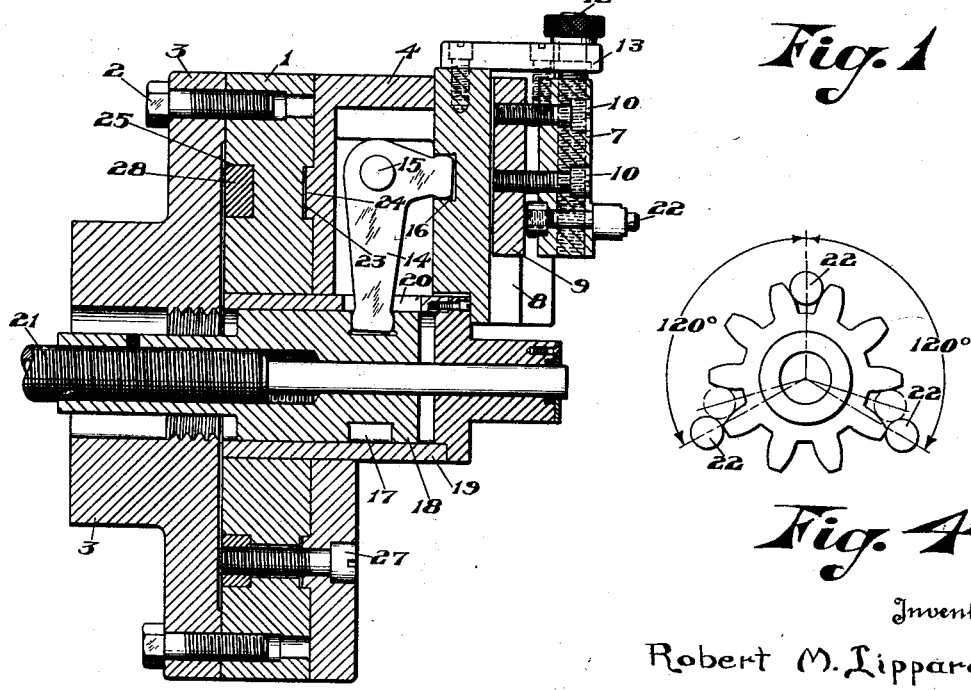
Fig. 2 is a section on the line 2—2 of Fig. 1.
Fig. 4 is a diagrammatic view illustrating the operation of the invention.

The chuck shown in Figs. 1 and 2 has a body portion constituted by an annular member 1, the latter being adapted for attachment, as by bolts 2, 2, to a face plate 3 on the end of a grinding or other machine spindle, not shown. On the front face of annular member 1 are mounted, in a manner hereinafter to be described, the slides 4, 4 (here shown as three in number) which carry the radially movable jaws of the chuck. The several slide and jaw assemblies are all of the same construction, so that a description of one will suffice for all.

Figure 3:
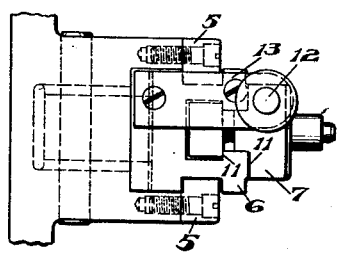
Fig. 3 is a top plan view of one of the jaw assemblies.

Each slide 4, by means of gibs 5, 5 attached thereto, provides an undercut guideway for the movement of a jaw carrier 6, the latter serving as a support in which the associated chuck jaw 7 is capable of adjustment, in and out, as desired. To this end, the carrier 6, as shown in Fig. 3, provides an internal recess 8 for the reception of a clamping block 9, the latter receiving screws 10, 10 projecting rearwardly from the jaw 7. By tightening the screws 10, 10, the clamping block 9 and jaw 7 are drawn toward each other and into firm engagement against opposite sides of the shoulders 11, 11 of carrier 6, thereby to fix the position of the jaw 7 in said carrier. When the screws 10, 10 are loosened, the jaw 7 and block 9 are free to be moved inwardly or outwardly as desired, and such movement can be effected by an adjusting screw 12, threaded into the jaw, and mounted to turn freely, without longitudinal movement, in an overhanging bracket 13 secured to the top of the carrier 6. In this way, the several jaws 7, 7 of the chuck can readily be adjusted to accommodate the chuck to workpieces of various sizes.

In each of the slides 4 is a bell crank lever 14, pivoted on a transverse pin 15. One arm of said lever is received in a suitable slot 16 formed in the rear face of the associated jaw carrier 6, so that rocking of said lever will effect inward or outward movement of the associated jaw, to engage it with or disengage it from the workpiece. The other inwardly extending arms of all the levers 14 are received in a peripheral groove 17 of a centrally-located chuck-operating member 18, the latter being slidably mounted in a concentric sleeve 19 carried by the chuck body 1, which sleeve is slotted, as shown at 20, for the passage of the inwardly extending arms of the several levers 14, 14. The member 18 is attached in any suitable way to a rearwardly extending draw rod 21; when the latter is shifted to the right, Fig. 2, the several arms 14, 14 are rocked in unison to impart outward radial movements to the chuck jaws 7, 7, thereby releasing the work; the opposite movement of said draw rod rocks the levers 14, 14 in unison to move the chuck jaws 7, 7 inwardly, for gripping the work.

In the use of a chuck of this character for the retension and centering of a gear wheel or the like, it is the general practice to equip each jaw with a projecting pin 22,—the work under these conditions being firmly held by the reception of said pins in the spaces between its projections or teeth, as indicated in Fig. 4. However, an obstacle to this advantageous chucking method is encountered when the spacing between the teeth or projections of the object to be held is such as not to line up with all the pins 22, 22; in other words, it frequently happens, as shown in Fig. 4, that the spaces of the object will be offset from one or more of the pins 22, when the later, as is the usual case with a three jaw chuck, are in equidistant relation, 120° apart. According to the present invention, this difficulty is overcome by the provision of angular adjustment for one or more of the slides 4, 4 on the face of the chuck body 1. To that end, the front face of body 1 provides an annular recess 23 in which fits an arcuate projection 24 of each of the several slides 4, 4. The rear face of body 1 is similarly recessed, as shown at 25, and in the zones of attachment to said body of one or more of said slides, the recesses 23 and 25 are connected by elongated arcuate slots 26, 26 adapted for the passage therethrough of screws 27, 27. Said screws have threaded engagement with suitable arcuate keys 28, 28, located in the recess 25; thus each slide is held in position by the clamping action produced by tightening of its screws 27, 27, serving to draw the slide and the associated key 28 toward each other, into firm engagement with the body 1. If the spaces between the projections or the work, as shown in Fig. 4, do not permit of registry with all of the pins 22, an angular adjustment of one or more of the slides 4 can be made, to secure such registration,—this angular adjustment being made possible by the elongated slots 26, 26 provided for the passage of the clamping screws 27, 27. By this adjustment, the pins 22, shown in full lines in non-registering position, can be shifted to the registering positions shown by broken lines in Fig. 4.

It is further to be noted that, notwithstanding angular adjustments of the slides 4, 4 as above described, the radial disposition of each of said slides is invariably maintained; this is due to the reception of the arcuate projection 24 of each slide in the annular recess 23 of body 1, which prevents said slide from assuming a non-radial position on said body.

I claim,

1. In a chuck of the class described, a plurality of slidable jaws, a mounting for each jaw in which the latter is slidable radially, and means for adjusting the mountings of said jaws, to vary the angular distance between said jaws, without disturbing their radial relation.

2. In a chuck of the class described, a body portion providing slideways for a plurality of radially movable jaws, means for adjusting said slideways on said body portion to vary the angular distance between said jaws, and means for maintaining, in different positions of adjustment of said slideways, the radial relation of said jaws.

3. In a chuck of the class described, a body portion, a plurality of radially movable jaws, slideways provided by said body portion for the movement of said jaws, and means for angularly adjusting certain of said slideways without disturbing the radial relation of said jaws.

4. In a chuck of the class described, a body portion, a plurality of radially movable jaws, slideways provided by said body portion for the radial movement of said jaws, means for angularly adjusting certain of said slideways to vary the relative angular positions of said jaws, and means for maintaining the radial disposition of said jaws in different positions of adjustment of said slideways.

5. In a chuck of the class described, a body portion having an annular recess, slideways for a plurality of radially movable jaws carried by said body portion, means for angularly adjusting certain of said slideways, and an arcuate projection on each of the later fitting the recess of said body portion, whereby to maintain the radial relation of the jaws in different positions of adjustment of said slideways.

6. In a chuck of the class described, a plurality of jaws mounted for sliding movement radially, means for angularly adjusting the mountings of said jaws, to vary the angular distance between them, a lever carried by each jaw mounting, for imparting radial movement to the jaw thereof, and a centrally disposed actuator common to all of said levers, said actuator having a peripheral groove to receive the ends of said levers, whereby to maintain its operative connection therewith in all positions of angular adjustment of said mountings.

ROBERT M. LIPPARD.